United States Patent Office 3,655,634
Patented Apr. 11, 1972

3,655,634
THIIRANE COPOLYMERS
Bernard Boucheron, Bethune, Paris, France, assignor to Societe Ethylene Plastique, Paris, France
No Drawing. Filed Sept. 8, 1970, Ser. No. 70,575
Claims priority, application France, Sept. 16, 1969, 6931476
Int. Cl. C08g 23/00
U.S. Cl. 260—79
9 Claims

ABSTRACT OF THE DISCLOSURE

Novel thermo-stable copolymers of thiirane are disclosed, these being statistical or sequential copolymers of thiirane and N,N'-methylene-bis-acrylamide containing from 0.1 to 5 mole percent of units derived from N,N'-methylene-bis-acrylamide. They are obtained by polymerisation in a medium containing a polar aprotic solvent and an alkali metal or alkali metal derivative as initiator.

---

This invention is concerned with certain novel thiirane copolymers and with a process for their preparation.

Thiirane (ethylene episulphide) and its higher homologues give homopolymers and copolymers which have a number of remarkable properties, but are, in most cases, unstable when heated to elevated temperatures. This drawback can be obviated by incorporating additives containing nitrogeneous groups in such polymers, but this operation is difficult to perform because thiirane polymers are insoluble in solvents at moderate temperatures and quickly decompose if an attempt is made to mix the additives with the polymer in the molten state.

We have now developed a class of thiirane copolymers which are much more thermo-stable than known thiirane polymers and copolymers and which can, therefore, be used at elevated temperatures.

According to the present invention, therefore, we provide, as new compounds, copolymers of thiirane and N,N'-methylene-bis-acrylamide containing from 0.1 to 5 mole percent of units derived from N,N'-methylene-bis-acrylamide.

The fact that a copolymer of thiirane and N,N'-methylene-bis-acrylamide can be obtained is unexpected, owing to the considerable difference between the basicity of thirrane "living homopolymers" and N,N'-methylene-bis-acrylamide. The improvement in the thermal stability of polythirane obtained by copolymerisation according to the invention is also unexpected, since N,N'-methylene-bis-acrylamide and its homopolymers, despite the presence of acrylamide radicals or groups in their molecules, are not polythiirane stabilisers.

The present invention also comprises a method of preparing the novel thiirane copolymers, which comprises polymerising thiirane and N,N'-methylene-bis-acrylamide in a medium containing at least one polar aprotic solvent at a temperature of from 20° to 100° C., and preferably from 40° to 50° C., and in the presence of an initiator which is an alkali metal or an alkali metal derivative selected from alkali metal hydroxides, alkali metal salts, alkali metal hydrocarbon derivatives, such as triphenylmethyl potassium, alkali metal organic amine or amide derivatives, such as carbazyl potassium, and alkali metal alkoxides and thiolates.

Suitable polar aprotic solvents include, for example, dimethyl sulphoxide, dimethyl formamide, hexamethyl phosphoryl triamide, and tetramethylene sulphone, of which the first mentioned is preferred. The polymerisation medium may also contain, if desired, one or more non-polar aprotic solvents, such as hydrocarbons or ethers, which may be miscible or immiscible with the polar aprotic solvent(s) used.

The amount of initiator used is preferably from 0.05 to 1%; the larger the amount of initiator used, the greater the molecular weight of the copolymer obtained. The preferred initiator is potassium tert.butoxide.

The copolymers according to the invention can be of the statistical type, which is a product wherein the monomer units are distributed at random along the macromolecular chain or sequential type, which are the block copolymers. In the case of statistical copolymers, the best properties are provided by copolymers containing approximately 1 mole percent of units derived from N,N'-methylene-bis-acrylamide. In the case of sequential copolymers, copolymers containing 3.2 mole percent of units derived from N,N'-methylene-bis-acrylamide are preferred because they are particularly thermo-stable and extremely fluid at high temperatures. The statistical and sequential copolymers according to the invention can be prepared, within the limits of the method according to the invention, using any of the known techniques for preparing such polymers.

In order that the invention may be more fully understood, the following examples are given by way of illustration only. Examples 1, 4 and 6–10 illustrate processes and products according to the invention, whilst Examples 2, 3, 5 and 11 are given for the purpose of comparison.

EXAMPLE 1

60 ml. of dimethyl sulphoxide containing 2 millimoles of potassium tert.butoxide were poured into a glass reactor equipped with a powerful stainless steel mechanical stirring device and the necessary accessories for maintaining an anhydrous oxygen-free nitrogen atmosphere, and introducing the various reactants. The addition funnel was filled with a solution of 100 g. of thiirane and 3.75 g. of MBA in 380 ml. of dimethyl sulphoxide.

20 ml. of the monomer solution were added at room temperature (22° C.) and the reaction began immediately. The temperature rose to 25° C. During the rest of the experiment, the monomer solution was added at a substantially constant rate.

After 25 minutes the temperature rose to 40° C. and the apparatus had to be cooled in a cold water bath. At the end of an hour, two-thirds of the monomer solution was introduced over a period of 20 minutes.

20 minutes later, the reaction medium became much thicker and the temperature rose to 65° C. The mixture was cooled in a water bath and the experiment was stopped after 3 hours.

The copolymer was washed in water and then in methanol and finally dried at 80° C. in vacuo. 95 g. of a product having the following properties, were obtained:

Nitrogen content: 0.83 to 0.95% (i.e. 1.8 mole percent of units derived from N,N' - methylene - bis - acrylamide), showing that all the MBA had polymerised.

M.P. 196–198° C. (in the capillary tube).

The substance was stable on being heated for 28 minutes for the purpose of extrusion and remained ivory-coloured during the entire extrusion process (37 minutes).

Its stability was not improved by adding 2.5% of ethylene-diamino-bis-propionamide or 2% of tris-dimethylaminomethyl-2,4,6-benzenol.

EXAMPLE 2

Polymerisation was carried out in substantially the same way as in Example 1, except that the MBA was left out. The details were identical except for the following:

Initial solution in reactor: 95 ml. of solvent containing 3 millimoles of catalyst.

150 g. of monomer were dissolved in 1,420 ml. of solvent, and the polymerisation process was carried out for 4 hours at 25° C. The yield was 139 g. of polythiirane having the following properties:

M.P. 200–201° C. in the capillary tube and 205–208° C. when observed in a polarising microscope. The substance was stable for 7 minutes at extrusion temperature and remained white during the entire extension process. When 2.5% of ethylenediamino-bis ω,ω-propanamide was added, the stability increased to 18 minutes and the product remained ivory yellow during the entire extrusion process (41 minutes).

EXAMPLE 3

The process was the same as in Example 1 except for the following: there was no N,N'-methylene-bis-acrylamide, the initial solution in the reactor consisted of 20 ml. of dimethyl sulphoxide containing 0.25 millimoles of potassium tert.butoxide, and the 50 g. of monomer were dissolved in 500 ml. of dimethyl sulphoxide. The yield was 47 g. of polythiirane having the following properties:

The substance was thermally unstable, i.e. its hot fluidity index increased by a factor of 100 in 9 minutes. After 2.5% of ethylenediamino-bis-propanamide had been added, the product remained stable for 8 minutes and was yellowish at the end of the extrusion process (31 minutes).

EXAMPLE 4

Example 1 was repeated except for the following differences: A larger amount (600 ml.) of solvent was used in order to prevent undesirable thickening of the medium, and the temperature was kept constant at 50° C., except for the start at 40° C. The monomer solution was added very slowly so that the monomers could polymerise as soon as they were added and so as to prevent the risk of one monomer accumulating in the medium. The reaction lasted 7½ hours.

The yield, after separation, was 60 g. of copolymer having the following properties:

Nitrogen content: 1.1 to 1.4% (i.e. 2.2 mole percent of units derived from MBA), showing that all the MBA had polymerised since, in this case, the theoretical content of elementary nitrogen is 1.13%. The substance melted at 196–198° C. in the capillary tube. It remained stable for 7 minutes at extrusion temperature and kept its ivory colour during the entire extrusion process (15 minutes). Its stability was not improved by adding 2.5% of ethylene-diamino-bis-propionamide or 2% of tris-dimethylaminomethyl-2,4,6-benzenol.

EXAMPLE 5

Example 4 was repeated except for the following differences: A larger amount (750 ml.) of solvent was used, the temperature was kept constant at 44° C. except for the start at 40° C., and 2.5 millimoles of triphenyl phosphine were used as catalyst. A 95 g. yield of polymer having the following properties, was obtained:

The nitrogen content was 0.02%, showing that the polymer which was collected was pure polythiirane and consequently that the triphenyl phosphine had not caused copolymerisation of the MBA. The substance melted at 198–200° C. in the capillary tube. It was extruded in 6 minutes, remained ivory-coloured and no stability period was observed. When 2.5% of ethylenediamino-bis-propanamide was added, the substance became stable for 4 minutes.

EXAMPLE 6

The method was the same as in Example 1 except for the following differences: 1 millimole of potassium tert. butoxide was used and the monomer solution had the following composition: 500 ml. dimethyl sulphoxide, 50 g. thiirane and 5 g. N,N'-methylene-bis-acrylamide. The monomer solution was added over a period of 2 hours, agitation was continued and the temperature was maintained at 40° C. for 12 hours. The yield was 48 g. of copolymer containing 2.1 mole percent (instead of 3.8%) of units derived from MBA. The substance melted at 197–199° C. when observed in a polarising microscope. It was unstable before treatment, but after 2.5% of ethylenediamino-bis-propanamide had been added, its stability increased to 14 minutes; the total time for the extrusion process was 30 minutes.

EXAMPLE 7

The method was the same as in Example 6 except for the following differences: the volume of dimethylsulphoxide was 250 ml., the addition of monomer lasted for one hour, and the product obtained was dispersed by an addition of 250 ml. of dimethyl sulphoxide. 49 g. of copolymer was obtained, containing 0.45 mole percent of units derived from MBA. It melted at 203–206° C.

Before treatment, the substance was stable for 26 minutes (the total extrusion time was 40 minutes). After 2.5% of ethylenediamino-bis-propanamide had been added, the substance was stable for 32 minutes and was completely extruded in 60 mintues.

EXAMPLE 8

The method was the same as in Example 6 except for the following differences: the volume of dimethyl sulphoxide was 500 ml. and the monomers were added over a period of 45 minutes. 48 g. of copolymer were obtained, containing 0.95 mole percent (instead of the theoretical 3.8%) of units derived from MBA, and melting at 207–209° C.

Before treatment, the resin was very stable (the hot fluidity index increased by a factor of only 3.7 in 55 minutes). After 2.5% of ethylenediamino-bis-propanamide had been added, the substance remained stable for 60 minutes and was completely extruded in 1½ hours.

EXAMPLE 9

Polymerisation was carried out in two stages. 25 g. of thiirane and 10 g. of N,N'-methylene-bis-acrylamide were copolymerised in 250 ml. of dimethyl sulphoxide and 250 ml. of toluene, the reaction being initiated with 1 millimole of potassium tert.butoxide. This stage lasted 1½ hours, the monomer solution being added slowly, as in the preceding examples. In the second stage, 25 g. of thiirane in solution in 125 ml. of toluene, 125 ml. of dimethyl sulphoxide and 25 ml. of methanol, were added over a period of 10 minutes. Agitation and heating at 40° C. were continued for 3 hours, after which the mixture was left to stand overnight. The yield was 42 g. of copolymer containing 2.6 mole percent (compared with the theoretical 9.6%) of units derived from MBA and melting at 192–196° C. when observed in a polarising microscope. At the beginning of the extrusion process the product had a fluidity index of 1.3 dg./min. but became cross-linked after 22 minutes. This was probably due to the methanol which produced transferences resulting in large numbers of reactive thiol groups.

EXAMPLE 10

A sequential copolymer was prepared in two stages in the following order:

First, 5 g. of N,N'-methylene-bis-acrylamide in 250 ml. of dimethyl sulphoxide was polymerised at 60° C. in the presence of 1 millimole of potassium tert.butoxide as initiator. This stage lasted 5½ hours. The mixture was then cooled to 40° C. and 50 g. of thiirane dissolved in 500 ml. of dimethyl sulphoxide were added; further quantities of dimethyl sulphoxide, that is, respectively, 200 ml. and 100 ml., were added when the medium became too thick. This second stage lasted 1 hour. The mixture was then heated to 60° C. for 1 hour and left to stand for 2 days at room temperature. The yield was 50 g. of copolymer containing 3.2 mole percent (compared with the theoretical 3.8%) of units derived from MBA and melting at 203–207° C. when observed in a polarising microscope.

The crude product remained stable for 10 minutes (total extrusion time=28 minutes). After 2.5% of ethylenediamino-bis-propanamide had been added, it remained stable for at least 1 hour 18 minutes, the entire length of the extrusion process. The stabilised polymer had the following property: from the beginning to the end of the expansion the hot fluidity index increased only from 0.6 to 1.5 dg./min.; this shows that the product is very fluid and therefore easily injected, but is also very stable.

EXAMPLE 11

15.4 g. of N,N'-methylene-bis-acrylamide and 100 ml. of dimethyl sulphoxide were introduced into a 500 ml. flask equipped with a magnetic agitator under a pure, dry nitrogen atmosphere. The mixture was stirred to dissolve the monomer and 0.3 millimole of potassium thia-3-pentane-thiolate was added. The mixture was heated to 50° C. for 22 hours without the slightest gelling, and therefore polymerisation, being observed. 3 millimoles of the same initiator were then added. An hour later, the medium had solidified and the agitator had stopped. The gel was then washed in water and then in methanol and dried in a rotary evaporator at 80° C. at reduced pressure. The yield was 13.5 g. of cross-linked poly(N,N'-methylene-bis-acrylamide), similar to the product obtained with potassium tert.butoxide (Example 10).

This example shows that a thiolate can initiate the polymerisation of N,N'-methylene-bis-acrylamide. Since it is known that the polymerisation of thiirane can be initiated by an alkali metal derivative of an organic amide, such as R—CO—NHK, we have indirect evidence that the copolymerisation of thiirane and methylene-bis-acrylamide can be initiated with this compound.

I claim:

1. A copolymer of thiirane and N,N'-methylene-bis-acrylamide containing from about 0.1 to about 5 mole percent of units derived from N,N'-methylene-bis-acrylamide.

2. A copolymer as set forth in claim 1 which is of the sequential type.

3. A copolymer as set forth in claim 2 which contains about 3.2 mole percent of units derived from N,N'-methylene-bis-acrylamide.

4. A copolymer as set forth in claim 1 which is of the statistical type and contains from about 0.1 to about 2 mole percent of units derived from N,N'-methylene-bis-acrylamide.

5. A copolymer as set forth in claim 4 which contains about 1 mole percent of units derived from N,N-methylene-bis-acrylamide.

6. A method of preparing a thiirane copolymer as set forth in claim 1, which comprises the step of polymerising thiirane and N,N-methylene-bis-acrylamide in a medium containing at least one polar aprotic solvent at a temperature of from about 20° C. to about 100° C. and in the presence of an alkali metal initiator, selected from the group consisting of alkali metals, alkali metal hydroxides, alkali metal salts, alkali metal hydrocarbon derivatives, alkali metal organic amine and amide derivatives and alkali metal alkoxides and thiolates.

7. A method as set forth in claim 6, wherein said polar aprotic solvent is selected from the group consisting of dimethyl sulphoxide, dimethyl formamide, hexamethyl phosphoryl triamide, and tetramethylene sulphone.

8. A method as set forth in claim 6, wherein said polymerisation medium also contains at least one non-polar aprotic solvent.

9. A method as set forth in claim 6, wherein said polymerisation medium comprises dimethyl sulphoxide and polymerisation is effected in the presence of from about 0.05 to about 1% of potassium tert.butoxide as initiator.

References Cited

UNITED STATES PATENTS

| 3,247,171 | 4/1966 | Walker et al. | 260—80.3 |
|---|---|---|---|
| 3,317,489 | 5/1967 | Sander | 260—79 |
| 3,365,431 | 1/1968 | Gobrn et al. | 260—79.7 |

DONALD E. CZAJA, Primary Examiner

M. I. MARQUIS, Assistant Examiner

U.S. Cl. X.R.

260—45.9 R, 79.7, 80.3 N, 89.7 N